Nov. 14, 1950 J. H. VOSS 2,530,103
CIRCUIT FOR IDENTIFYING THE TRUNK CONNECTED TO AN OPERATOR'S POSITION
Filed Nov. 19, 1947
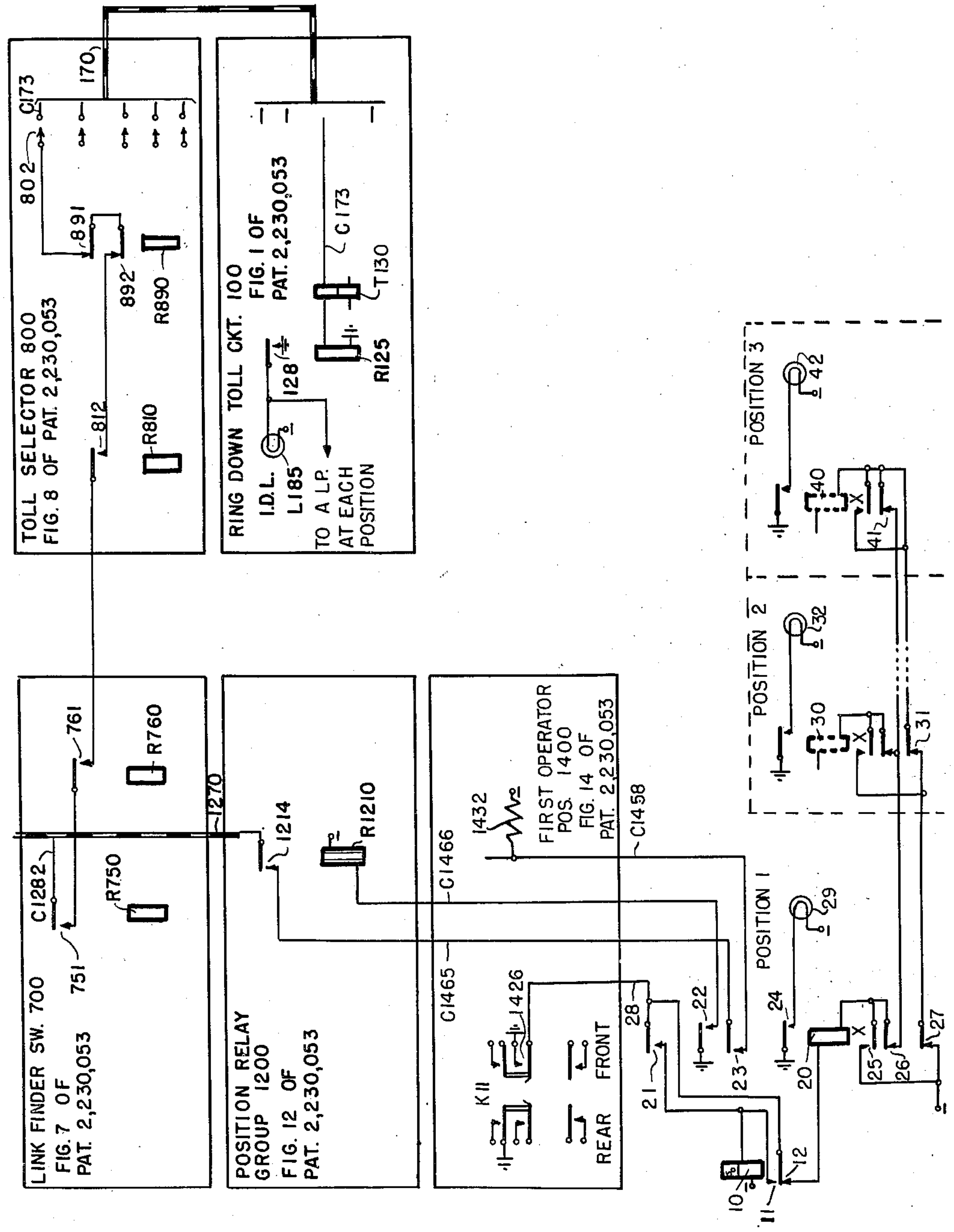
INVENTOR.
JOHN H. VOSS
BY
Chas. W. Cowdy
ATTORNEY Patented Nov. 14, 1950 2,530,103

UNITED STATES PATENT OFFICE 2,530,103

CIRCUIT FOR IDENTIFYING THE TRUNK CONNECTED TO AN OPERATOR'S POSITION

John H. Voss, Rochester, N. Y., assignor to Automatic Electric Laboratories, Inc., Chicago, Ill., a corporation of Delaware Application November 19, 1947, Serial No. 786,986

9 Claims. (Cl. 179—27)

The present invention relates to telephone systems in which toll calls are extended through automatic toll boards, and more specifically to means for identifying the trunk circuit that is selected for extending a call from a particular operator postiion.

This invention is an improvement in the telephone system shown in Patent No. 2,230,053; issued January 28, 1941, to T. F. Crocker. The Crocker patent shows a telephone system in which an automatic toll board has a plurality of operator positions and each position has a plurality of link circuits. Each link circuit comprises a finder switch for receiving a call and a selector switch for extending a call over a trunk circuit. Upon receiving a call and being informed of its destination, the operator dials for directively operating the selector switch to connect with a desired group of trunk circuits; and then the selector switch automatically connects the operator position to an idle trunk circuit of that group. At any subsequent time while the connection is established, the operator may operate the identity check key at her position to illuminate an identity lamp at each position of the toll board to indicate the particular trunk circuit engaged. Should two operators, who have links engaging trunk circuits of the same selected group, have their check keys operated simultaneously, an identity lamp for each operated key is illuminated at each position. Further manipulation of the keys is required so that each operator can determine which lamp is responsive to the check key of her respective position.

An object of the present invention is to illuminate at any one time only the identity lamps corresponding to one trunk circuit and to provide means for informing the operator that the identifying signal is for that position rather than for any other position.

A feature of the invention prevents an operator from inadvertently monopolizing the identifying system. Shortly after a group of lamps associated with one engaged trunk circuit is illuminated in response to the operation of a key at a position, means operate automatically to extinguish the lamps and to remove control of any of the identity lamps from that position while the check key remains operated. If a second operator operates her respective check key while any group of identity lamps is illuminated the control of the identity lamps is automatically transferred to the second operator position when the first lamps are extinguished.

The invention is illustrated in the accompanying single sheet drawing wherein clearly designated block diagrams represent five drawings of the previously mentioned Crocker patent. Position relay group 1200, link finder switch 700, and toll selector 800 are all individual with the first operator position 1400; whereas, ring down toll circuit 100 is accessible to all operator positions. Trunk circuits similar to ring down toll circuit 100 are arranged in groups and each group is selectable through toll selectors. Each of the operator positions, such as the positions designated as position 2, and position 3, have circuits associated therewith similar to the circuits individually associated with position 1. Further, several links comprising link finder switches and toll selectors are available from each position.

Identity lamp L185 is located at position 1 and is shown connected to its controlling circuit at ring down toll circuit 100. A similar identity lamp controlled through ring down toll circuit 100 is located at each operator position, all identity lamps controlled by this toll trunk circuit constituting a group of identity lamps. Each trunk circuit accessible to the operator positions controls a different group of identity lamps having lamps visible at all toll operator positions. The only circuit shown in detail in the block diagrams is the circuit responsive to key K11 of operator position 1 for illuminating the identity lamps associated with ring down toll circuit 100.

Except for a slight modification of the first operator position 1400 to include additional relays 10 and 20, the circuits remain as described in the previously mentioned Crocker patent. The newly added slow-operation relay 10 and control relay 20 operate in response to the actuation of key K11 to control the circuits for identifying an out-going trunk circuit, such as ring down toll circuit 100, that has been seized by a selected one of several links associated with the first operator position. For example, ring down toll circuit 100 is identified by the illumination of lamp L185 at operator position 1, and by the illumination of other lamps of the group at other operator positions. In order to inform the operator of position 1 that the identity signal is for her position, identity check lamp 29 individual to that position is illuminated simultaneously with lamp L185. Had the ring down toll circuit 100 been engaged by another position, such as position 2 or 3, and had one of the respective identity check keys been operated, the lamp such as lamp 32 or 42 individual to the position initiating the check would have been illuminated in addition to the group of identity lamps including lamp L185.

An interlocking chain circuit common to all toll operator positions and including contacts of relays such as control relays 20, 30 and 40 of positions 1, 2, and 3, respectively, prevent more than one identity check operation from being completed at one time, regardless of the number of identity check keys operated simultaneously.

The circuits for controlling the identity lamps of ring down toll circuit 100 from the first operator position 1400 will now be described in detail. If an operator is ready to accept an incoming call, she operates the talk key of link finder switch 700 at her position to cause the switch to find the calling trunk circuit. Also, the operation of the talk key completes a circuit for operating connect relay R750, which at contacts 751 closes a point in the control circuit of the identity lamps as described in the previously mentioned Crocker patent.

After the connection is completed between the operator and the calling subscriber, and after the operator is informed of the destination of the call, she operates the keys at the sender key set of her position to register the digits required to obtain the desired subscriber. The impulses comprising the digits are transmitted into the toll selector 800 to operate it in the well known manner to select an idle trunk circuit, for example, ring down toll circuit 100. When all of the digits that were registered in the digit register and control circuit have been transmitted, a circuit is completed for operating cut-in relay R760, which closes another point in the identity control circuit at contacts 761. As the control wiper of the toll selector 800 encounters negative battery on the control lead of trunk 170 extending to the idle ring down toll circuit 100, electropolarized relay R810 operates; and in addition to controlling a circuit to stop rotary stepping of the wipers, it closes still another point at contacts 812 in the circuit for controlling the identity lamps of the seized trunk circuit.

After the circuit between the operator position and ring down toll circuit 100 has been completed and relay R760 has been operated, the operator may identify the engaged trunk circuit by operating the identity check key K11 to its front position. At contacts 1426 the following circuit is completed for operating control relay 20: ground, contacts 1426, conductor 28, contacts 12 of relay 10, winding of relay 20, contacts 26, contacts 41, contacts 31, contacts 27, and negative battery. The first contacts of relay 20 to operate are contacts 25 to complete an obvious locking circuit from the winding of the relay to negative battery. At contacts 26 and 27 negative battery is removed from all other relays which in other positions correspond to relay 20, such as relays 30 and 40 of positions 2 and 3 respectively, to prevent their operation until after relay 20 releases. At contacts 23 a circuit is prepared for operating identity relay R125; and at contacts 22 a circuit is completed from ground, contacts 22, conductor C1466, winding of front split relay R1210, to negative battery.

The operation of front split relay R1210 completes the following circuit for operating identity relay R125; negative battery, resistor 1432, conductor C1458, contacts 23, conductor C1465, contacts 1214, conductor C1282 of cable 1270, contacts 751, contacts 761, contacts 812, contacts 892, contacts 891, wiper 802, conductor C173 of cable 170, upper winding of relay T130, winding of identity relay R125, and ground. Relay R125 at contacts 128 closes the circuits for illuminating identity lamp L185 at the first operator position 1400, and a similar lamp at each of the other operator positions at the toll board to identify ring down toll circuit 100. Also, upon operating, relay 20 at contacts 24 completes an obvious circuit for illuminating position identity check lamp 29 individual to position 1 to inform the operator that the toll circuit being identified is engaged by that position. Finally, when relay 20 operates, contacts 21 close the following circuit to energize slow-operating relay 10: ground, contacts 1426, contacts 21, winding of relay 10, and negative battery. After an interval, relay 10 operates, at contacts 12 opens the operating circuit of relay 20, and at contacts 11 completes a locking circuit for maintaining relay 10 operated until key K11 is returned to normal position, the locking circuit being from ground, contacts 1426, conductor 28, contacts 11, winding of relay 10, to negative battery.

Upon releasing, relay 20 at contacts 23 opens the previously traced circuit which controls the identity lamps, to extinguish lamp L185 and other lamps in the group, at contacts 24 opens the circuit to extinguish lamp 29, at contacts 23 opens the circuit of front split relay R1210, at contacts 28 opens the initial circuit for energizing the winding of relay 10, at contacts 25 opens another point in the locking circuit of relay 20, at contacts 26 prepares the operating circuit of relay 20 for the next check operation from position 1, and at contacts 27 completes the chain circuit to battery.

Should the identity check key at another position of the toll board be operated at this time, the relay which at that position corresponds to relay 20 would be energized upon the completion of the chain circuit at contacts 27. This relay then controls circuits similar to those for position 1, and thus illuminates the group of identity lamps corresponding to the trunk circuit engaged through a particular link at that position, and also illuminates a position identity check lamp individual to that position.

Relay R1210 releases to open another point in the circuit of relay R125. As long as slow-operating relay 10 remains operated over the circuit including operated key K11, position 1 exerts no control over the identifying circuit. When the operator restores key K11, relay 10 releases restoring the identifying circuits of position 1 in preparation for another identifying operation. After a call is completed, the switches for establishing talking and supervisory circuits are restored to normal as described in the previously mentioned patent.

The circuit as described herewith in detail may be adapted to telephone systems using various type switches, and may also be used to identify any engaged circuit which is accessible from more than one position.

What is claimed is:

1. In a telephone system, a toll board, a plurality of operator positions at said toll board, a plurality of trunk circuits, each of said trunk circuits being accessible from each of said operator positions for extending a call to a distant station, means controlled from any one of said operator positions for engaging an idle one of said trunk circuits, a group of identity lamps for each of said trunk circuits, each of said groups common to said operator positions, a position identity check lamp and an identity check key individual to each of said positions, means responsive to the operation of one of said identity check keys at said one of said positions for illuminating a particular group of said common identity lamps to identify the trunk circuit engaged by said one position, and means also responsive to said one key operation for illuminating the one of said individual position identity check lamps at said one position.

2. In a telephone system, groups of trunk circuits, a toll board comprising a plurality of operator positions, toll selector switches having access to said trunk circuits, said toll selectors directively operated from said operator positions to select a particular group of said trunk circuits and automatically operated to select an idle trunk circuit in said selected group, a group of identity lamps for each trunk circuit, each of said groups of identity lamps having a lamp visible from each of said operator positions, a control relay individual to each of said positions, lamp controlling circuits controlled by said relays for illuminating said lamps to identify engaged trunk circuits, an identity check key at each of said positions to operate a corresponding one of said control relays, an operating circuit for said control relays having a chain circuit controlled by each of said control relays, one of said control relays at any one of said positions operating in response to the operation of the corresponding check key to complete one of said lamp controlling circuits to illuminate the group of identity lamps identifying the trunk circuit engaged by said last position, and to open said chain circuit to prevent the operation of other of said control relays and the completion of the remaining lamp controlling circuits, thereby, ensuring that only one group of said identity lamps is illuminated at a time.

3. In a system for identifying an engaged trunk circuit as claimed in claim 2, a position identity check lamp at each of said positions illuminated one at a time in response to the operation of the corresponding one of said control relays, the illumination of each one of said position identity check lamps indicating that the associated position initiated the operation for illuminating a group of said identity lamps.

4. In a system for identifying an engaged trunk circuit as claimed in claim 2, a slow-operating relay for each of said positions, an operating circuit and a locking circuit for each of said slow-operating relays, each of said operating circuits controlled by a corresponding one of said control relays, each of said locking circuits controlled by the respective one of said slow-operating relays and by a corresponding one of said identity check keys, a locking circuit for each of said control relays controlled by the corresponding one of said slow-operating relays, any one of said slow-operating relays energized in response to the operations of said corresponding control relay, said energized slow-operating relay operating an interval after its energization to close its locking circuit for maintaining it operated during the operate time of the corresponding one of said check keys and also to open the locking circuit of said last control relay, said last relay restoring to extinguish automatically the group of said identity lamps illuminated by its operation and to close said chain circuit regardless of the operated or restored position of said last identity check key.

5. In a telephone system, an operator position, groups of trunk circuits accessible to said position, a group of identity lamps individual to each of said trunk circuits, means directively operated from said operator position for selecting a group of said trunk circuits, means operating automatically to select an idle trunk circuit of said selected group, means responsive to the selection of said idle trunk circuit for placing said group of identity lamps associated therewith under the control of said operator position, a control relay at said position, controlling means to operate said control relay, a slow-operating relay at said position, additional means for operating said slow-operating relay, said slow-operating relay when operated restoring said control relay, a position identity check lamp, means operative at will from said position to operate said controlling means for operating said control relay, said last mentioned group of identity lamps and said position identity check lamp illuminated in response to the operation of said control relay, said additional means operated also in response to the operation of said control relay for causing said slow-operating relay to operate an interval thereafter to restore automatically said control relay, the restoration of said control relay extinguishing said last mentioned group of identity lamps and said position identity check lamp.

6. In a telephone system, a toll board comprising a plurality of operators' positions, a plurality of toll trunks, operator controlled means at each of said positions for engaging any one of said toll trunks to extend a connection, a plurality of multiple identity lamps for each of said toll trunks arranged so that an identity lamp for each toll trunk is visible to each operator's position, circuit means at each operator's position operative at any one of said operator's position for illuminating the multiple identity lamps corresponding to any one of said toll trunks engaged in an extended connection by said one operator's position, and inter-connection circuit controlling means inter-connecting said operator positions for preventing the simultaneous illumination of the identity lamps corresponding to more than one of said toll trunks at a time.

7. In a telephone system, a toll board comprising a plurality of operators' positions, a plurality of toll trunks, operator controlled means at each of said positions for engaging any one of said toll trunks to extend a connection, a plurality of multiple identity lamps for each of said toll trunks arranged so that an identity lamp for each toll trunk is visible to each operator's position, circuit means at each operator's position operative at any one of said operator's position for illuminating the multiple identity lamps corresponding to any one of said toll trunks engaged in an extended connection by said one operator's position, and automatic timing means for automatically limiting the duration of the illuminating time of the identity lamps corresponding to any one of said toll trunks.

8. In a telephone system, a toll board comprising a plurality of operators' positions, a plurality of toll trunks, operator controlled means at each of said positions for engaging any one of said toll trunks to extend a connection, a plurality of multiple identity lamps for each of said toll trunks arranged so that an identity lamp for each toll trunk is visible to each operator's position, circuit means at each operator's position operative at any one of said operator's position for illuminating the multiple identity lamps corresponding to any one of said toll trunks engaged in an extended connection by said one operator's position, and inter-position circuit controlling means inter-connecting said operator positions for temporarily assigning said circuit means at only one of said positions at a time to the exclusive use of such position, and timing means for disabling said circuit means at said one position after a predetermined time and for thereafter enabling the said circuit means at any one of the remaining operators' positions.

9. In a telephone system, a toll board comprising a plurality of operators' positions, a plurality of toll trunks, operator controlled means at each of said positions for engaging any one of said toll trunks to extend a connection, a plurality of multiple identity lamps for each of said toll trunks arranged so that an identity lamp for each toll trunk is visible to each operator's position, circuit means at each operator's position operative at any one of said operator's position for illuminating the multiple identity lamps corresponding to any one of said toll trunks engaged in an extended connection by said one operator's position, automatic timing means for automatically limiting the duration of the display time of the identity lamps corresponding to any one of said toll trunks, and interposition circuit controlling means inter-connecting said positions effective in case a plurality of said circuit means at a plurality of said positions are simultaneously operated for enabling only one of said circuit means at a time to be effective to display the identity lamps of one toll trunk and for enabling the remaining operated circuit means to be effective in rotation to display the identity lamps of other toll trunks in response to the successive operations of said timing means.

JOHN H. VOSS.

REFERENCES CITED

The following references are of record in the file of this patent:

UNITED STATES PATENTS

| Number | Name | Date |
|---|---|---|
| 2,027,197 | Powell | Jan. 7, 1936 |
| 2,230,053 | Crocker | Jan. 28, 1941 |
| 2,303,015 | Beaumont | Nov. 24, 1942 |